United States Patent
Kim et al.

(10) Patent No.: US 7,369,501 B2
(45) Date of Patent: May 6, 2008

(54) APPARATUS AND METHOD FOR CONTROLLING REVERSE-LINK DATA TRANSMISSION RATE DURING HANDOFF

(75) Inventors: Ki Jun Kim, Seoul (KR); Young Woo Yun, Seoul (KR); Soon Yil Kwon, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 552 days.

(21) Appl. No.: 10/837,550

(22) Filed: Apr. 29, 2004

(65) Prior Publication Data

US 2004/0218533 A1  Nov. 4, 2004

Related U.S. Application Data

(60) Provisional application No. 60/516,232, filed on Oct. 30, 2003, provisional application No. 60/515,897, filed on Oct. 29, 2003, provisional application No. 60/514,383, filed on Oct. 24, 2003.

(30) Foreign Application Priority Data

Apr. 29, 2003  (KR) .................. 10-2003-0027199
Oct. 31, 2003  (KR) .................. 10-2003-0076562

(51) Int. Cl.
*G01R 31/08* (2006.01)
*G08C 17/00* (2006.01)
*H04Q 7/00* (2006.01)

(52) U.S. Cl. ................ 370/235; 370/331; 370/311

(58) Field of Classification Search ............ 370/331, 370/311, 325; 455/453, 442
See application file for complete search history.

(56) References Cited

U.S. PATENT DOCUMENTS 6,366,778 B1 *  4/2002  Bender et al. ............ 455/442
2002/0077113 A1 *  6/2002  Spaling et al. ........... 455/453
2003/0112821 A1 *  6/2003  Cleveland et al. ........ 370/468

* cited by examiner

*Primary Examiner*—Joseph Feild
*Assistant Examiner*—Kiet Doan
(74) *Attorney, Agent, or Firm*—Lee, Hong, Degerman, Kang & Schmadeka

(57) ABSTRACT

Method and apparatus for controlling data transmission rate in a wireless communication system during handoff comprises a terminal recognizing an active set comprising a serving base station and at least one non-serving base station with respect to the terminal communicating with the network at a first data transmission rate, receiving a first rate control parameter from the serving base station and a second rate control parameter from the at least one non-serving base station, wherein the first and second rate control parameters are associated with determination of a second data transmission rate of the terminal during the handoff and determining the second data transmission rate in response to the first and the second rate control parameters, wherein the second data transmission rate is one of increased rate, decreased rate and same rate from the first data transmission rate.

33 Claims, 8 Drawing Sheets

APPARATUS AND METHOD FOR CONTROLLING REVERSE-LINK DATA TRANSMISSION RATE DURING HANDOFF

CROSS REFERENCE TO RELATED APPLICATIONS

Pursuant to 35 U.S.C. § 119(a), this application claims the benefit of the Korean Applications Nos. 2003-27199 filed on Apr. 29, 2003 and 2003-76562 filed on Oct. 31, 2003, the contents of which are hereby incorporated by reference herein in their entirety.

This application also claims the benefit of U.S. Provisional Application Ser. Nos. 60/514,383 filed on Oct. 24, 2003, 60/515,897 filed on Oct. 29, 2003, and 60/516,232, filed on Oct. 30, 2003, the contents of which are hereby incorporated by reference herein in their entirety.

BACKGROUND OF THE INVENTION

1. Field of the Invention

The present invention relates to a mobile communications system, and more particularly, to a method and apparatus for controlling a data transmission rate for a reverse link, in which a traffic-to-pilot power ratio is used to set the data transmission rate of a terminal under handoff.

2. Discussion of the Related Art

In the world of cellular telecommunications, those skilled in the art often use the terms 1G, 2G, and 3G. The terms refer to the generation of the cellular technology used. 1G refers to the first generation, 2G to the second generation, and 3G to the third generation.

1G is used to refer to the analog phone system, known as an AMPS (Advanced Mobile Phone Service) phone systems. 2G is commonly used to refer to the digital cellular systems that are prevalent throughout the world, and include CDMA-One, Global System for Mobile communications (GSM), and Time Division Multiple Access (TDMA). 2G systems can support a greater number of users in a dense area than can 1G systems.

3G is commonly used to refer to the digital cellular systems currently being developed. Recently, third-generation (3G) CDMA communication systems have been proposed including proposals, such as cdma2000 and W-CDMA. These 3G communication systems are conceptually similar to each other with some significant differences.

A cdma2000 system is a third-generation (3G) wideband; spread spectrum radio interface system which uses the enhanced service potential of CDMA technology to facilitate data capabilities, such as Internet and intranet access, multimedia applications, high-speed business transactions, and telemetry. The focus of cdma2000, as is that of other third-generation systems, is on network economy and radio transmission design to overcome the limitations of a finite amount of radio spectrum availability.

Referring to FIG. 1, a wireless communication network architectures is illustrated. A subscriber uses a Mobile Station 2 to access network services. The Mobile Station 2 may be a portable communications unit, such as a hand-held cellular phone, a communication unit installed in a vehicle, or a fixed-location communications unit.

The electromagnetic waves from the Mobile Station 2 are transmitted by the Base Transceiver System (BTS) 3 also known as node B. The BTS 3 consists of radio devices such as antennas and equipment for transmitting radio waves. The Base Station Controller (BSC) 4 receives the transmissions from one or more BTS's. The BSC 4 provides control and management of the radio transmissions from each BTS 3 by exchanging messages with the BTS and the Mobile Switching Center (MSC) 5 or Internal IP Network. The BTS's 3 and BSC 4 are part of the Base Station (BS) 6.

The BS 6 exchanges messages with and transmits data to a Circuit Switched Core Network (CSCN) 7 and Packet Switched Core Network (PSCN) 8. The CSCN 7 provides traditional voice communications and the PSCN 8 provides Internet applications and multimedia services.

The Mobile Switching Center (MSC) 5 portion of the CSCN 7 provides switching for traditional voice communications to and from a Mobile Station 2 and may store information to support these capabilities. The MSC 2 may be connected to one of more BS's 6 as well as other public networks, for example a Public Switched Telephone Network (PSTN) (not shown) or Integrated Services Digital Network (ISDN) (not shown). A Visitor Location Register (VLR) 9 is used to retrieve information for handling voice communications to or from a visiting subscriber. The VLR 9 may be within the MSC 5 and may serve more than one MSC.

A user identity is assigned to the Home Location Register (HLR) 10 of the CSCN 7 for record purposes such as subscriber information, for example Electronic Serial Number (ESN), Mobile Directory Number (MDR), Profile Information, Current Location, and Authentication Period. The Authentication Center (AC) 11 manages authentication information related to the Mobile Station. The AC 11 may be within the HLR 10 and may serve more than one HLR. The interface between the MSC 5 and the HLR/AC 10, 11 is an IS-41 standard interface 18.

The Packet Data Serving Node (PDSN) 12 portion of the PSCN 8 provides routing for packet data traffic to and from Mobile Station. The PDSN 12 establishes, maintains, and terminates link layer sessions to the Mobile Station's 2 and may interface with one of more BS 6 and one of more PSCN 8.

The Authentication, Authorization and Accounting (AAA) 13 Server provides Internet Protocol authentication, authorization and accounting functions related to packet data traffic. The Home Agent (HA) 14 provides authentication of MS 2 IP registrations, redirects packet data to and from the Foreign Agent (FA) 15 component of the PDSN 8, and receives provisioning information for users from the AAA 13. The HA 14 may also establish, maintain, and terminate secure communications to the PDSN 12 and assign a dynamic IP address. The PDSN 12 communicates with the AAA 13, HA 14 and the Internet 16 via an Internal IP Network.

FIG. 2 illustrates a data link protocol architecture layer 20 for a wireless network. It includes an upper layer 60, a link layer 30 and a physical layer 21.

The upper layer 60 contains three basis services; voice services 62, data services 61 and signaling 70. Voice services 62 include PSTN access, mobile-to-mobile voice services, and Internet telephony. Data services 61 are services that deliver any form of data on behalf of a mobile end user and include packet data applications such as IP service, circuit data applications such as asynchronous fax and B-ISDN emulation services, and SMS. Signaling 70 controls all aspects of mobile operation.

The Link Layer 30 is subdivided into the Link Access Control (LAC) sublayer 32 and the Medium Access Control (MAC) sublayer 31. The link layer 30 provides protocol support and control mechanisms for data transport services and performs the functions necessary to map the data transport needs of the upper layer 60 into specific capabilities and characteristics of the physical layer 21. The Link Layer 30 may be viewed as an interface between the upper layers and the Physical Layer 20.

The separation of MAC 31 and LAC 32 sublayers is motivated by the need to support a wide range of upper layer 60 services, and the requirement to provide for high efficiency and low latency data services over a wide performance range (from 1.2 Kbps to greater than 2 Mbps). Other motivators are the need for supporting high QoS delivery of circuit and packet data services, such as limitations on acceptable delays and/or data BER (bit error rate), and the growing demand for advanced multimedia services each service having a different QoS requirements.

The LAC sublayer 32 is required to provide a reliable, in-sequence delivery transmission control function over a point-to-point radio transmission link 42. The LAC sublayer 32 manages point-to point communication channels between upper layer 60 entities and provides framework to support a wide range of different end-to-end reliable link layer 30 protocols.

The MAC sublayer 31 facilitates complex multimedia, multi-services capabilities of 3G wireless systems with Quality of Service (QoS) management capabilities for each active service. The MAC sublayer 31 provides procedures for controlling the access of data services (packet and circuit) to the physical layer 21, including the contention control between multiple services from a single user, as well as between competing users in the wireless system. The MAC sublayer 31 also provides for reasonably reliable transmission over the radio link layer using a Radio Link Protocol (RLP) 33 for a best-effort level of reliability. Signaling Radio Burst Protocol (SRBP) 35 is an entity that provides connectionless protocol for signaling messages. Multiplexing and Quality of Service (QoS) Control 34 is responsible for enforcement of negotiated QoS levels by mediating conflicting requests from competing services and the appropriate prioritization of access requests.

The Physical Layer 20 is responsible for coding and modulation of data transmitted over the air. The Physical Layer 20 conditions digital data from the higher layers so that the data may be transmitted over a mobile radio channel reliably.

The Physical Layer 20 maps user data and signaling, which the MAC sublayer 31 delivers over multiple transport channels, into a physical channels and transmits the information over the radio interface. In the transmit direction, the functions performed by the Physical Layer 20 include channel coding, interleaving, scrambling, spreading and modulation. In the receive direction, the functions are reversed in order to recover the transmitted data at the receiver.

An optimum rate of data transmission in the reverse link of a mobile communications system, for example, a first-evolution data-optimized (1xEV-DO) system, is determined with respect to the rise-over-thermal of a given base station 6. The rise-over-thermal is a dynamic reception characteristic defined as total power of signal of total power received at the base station 6, from all active mobile stations 2 (also referred to as terminals), and the thermal noise detected at the base station. In other words, the rise-over-thermal is the summed signal power of all active-terminal signals received at the base station 6, which is a function of reverse activity, i.e., the number and transmission rate of active terminals 2 operating in connection with the base station.

Ideal reverse-link conditions result when the rise-over-thermal at the base station 6 is maintained at a constant level despite fluctuations in reverse activity, such that the rise-over-thermal is a function of the various transmission rates for a given number of active terminals 2. Thus, the system compensates by controlling inter alia the data transmission rate of the reverse link of each terminal 2.

To enable such control, the rise-over-thermal is compared with a threshold value, and based on the comparison results, an active terminal 2 is requested to increase or decrease its transmission rate when communicating with the base station 6. That is, the transmission rate may be increased when the rise-over-thermal is below the threshold, but if the rise-over-thermal exceeds the threshold, it is necessary to decrease the transmission rate.

FIG. 3 illustrates a reverse-link transmission rate control method 50 according to a related art. As illustrated in FIG. 3, one base station 6 and one active terminal 2 of a 1xEV-DO system act together in each frame to set an optimum rate for the next frame of the reverse link.

In step S52, the base station 6 measures the rise-over-thermal (RoT) produced by the cumulative effect of all reverse-link data signals power. With the rise-over-thermal thus determined, the base station 6 generates, in step S54, a reverse activity bit (RAB) as part of an instruction word for use by a terminal 2. As described above, the RAB value or parameter is set according to a comparison of the rise-over-thermal and a predetermined threshold value, whereby one value would instruct the terminal 2 to decrease its transmission rate, and another value would instruct the terminal to increase its transmission rate.

In step S56, the base station 6 transmits the reverse activity bit to all active terminals 2 within active sectors, or all terminals transmitting data on the reverse link via a random access channel, which is a common channel. Thus, all terminals 2 simultaneously receive an instruction word containing the same reverse activity bit for a given frame, such that all terminals are simultaneously instructed to increase or decrease their set rate of data transmission for the next frame.

In step S58, a terminal 2 receiving the reverse activity bit performs a compliance test to determine whether the data transmission rate should be changed based on the received bit. The terminal 2 considers the data rate of the current frame of the reverse link transmission and, using a predetermined algorithm, determines either to comply with the instruction from the base station 6 and change the transmission rate accordingly or to ignore the instruction and set the transmission rate of the next frame equal to that of the current frame. In step S60, the terminal 2 sets the data transmission rate of the next frame.

In the aforementioned method 50 according to the related art, the reverse activity bit is generated based solely on the rise-over-thermal measured at the base station 6 and the bit is simultaneously transmitted as a single command to all active terminals 2 within active sectors. In other words, there is no consideration of the status of any one of the terminals 2. There are inherent disadvantages in this method.

For any given terminal 2, the only option other than complying with the instruction from the base station 6 is to ignore the instruction and maintain the current data transmission rate. Therefore, since the terminal 2 cannot consider its current status in determining whether to change its transmission rate, reverse-link transmission efficiency tends to suffer.

On the other hand, any given terminal 2 receiving a reverse activity bit may comply with the corresponding instruction or ignore the instruction based on the results of its own compliance test, and, therefore, may not change its transmission rate. Therefore, effective regulation of the rise-over-thermal by a base station 6 is hindered, which also degrades reverse-link transmission efficiency.

SUMMARY OF THE INVENTION

The present invention is directed to a to a method and apparatus for controlling a data transmission rate for a reverse link, in which a traffic-to-pilot ratio is used to set the data transmission rate of a terminal under handoff.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a mobile communication device that utilizes a traffic-to-pilot power ratio (T/P) to set a data transmission rate for terminals in communication with one or more base stations during handoff. Specifically, the status of terminal resources and the channel status of the reverse link are considered when a base station generates data transmission control information for transmission to a plurality of terminals.

In one aspect of the invention, a method is provided for controlling the data transmission rate in a mobile communication system during handoff for communicating between a network and a terminal. The method includes the steps of determining an active set with respect to a terminal communicating with a base station at a first transmission rate associated with a first T/P, transmitting terminal status to a serving base station, generating a rate control parameter for transmission from a serving base station to the terminal, generating a rate control parameter for transmission from a non-serving base station to the terminal, receiving the rate control parameters at the terminal, determining whether to decode the rate control parameters, and determining and setting a new data transmission rate for the terminal based on either the first T/P or a new T/P based on the rate control parameters.

Preferably, the terminal status information includes an indication of available terminal power and the amount of data to be transmitted. In generating reverse-link data transmission rate control parameters, such as a rate control bit (RCB), for a terminal having data to transmit, each base station considers its rise-over-thermal and a channel status of the reverse link. The RCB can be transmitted on a forward-link common channel, and dedicated ACK/NACK information for reverse-link packet data can be transmitted on a forward-link packet data reception acknowledgement channel, which may be multiplexed with the forward-link common channel.

In a preferred embodiment, the terminal decodes an RCB after receiving an ACK signal from any base station or after transmitting the last subpacket. It is contemplated that the terminal may only decode the RCB after simultaneously receiving an ACK signal from the base station transmitting the RCB.

A terminal sets the authorized traffic-to-pilot power ratio based on the RCB information received from the base stations and thereby establishes an appropriate setting for the reverse-link data transmission rate. With an authorized traffic-to-pilot power ratio thus determined, the reverse-link data transmission rate can be set accordingly.

In a preferred embodiment, the terminal decreases the authorized traffic-to-pilot power ratio if a decrease instruction is contained in the RCB information received from a non-serving base station. If no decrease instruction is contained in the RCB information received from a non-serving base station, the terminal sets the authorized traffic-to-pilot power ratio based on RCB information received from the serving base station.

The terminal maintains (holds) the current authorized traffic-to-pilot power ratio if the RCB information received from the serving base station is a hold instruction. The terminal increases the authorized traffic-to-pilot power ratio if the RCB information received from the serving base station is an increase instruction.

The terminal may also receive and process messages from a serving base station indicating that a specific data transmission rate be set. The specific rate message will override processing of an RCB from the serving base station such that, in the absence of an RCB from a non-serving base station indicating a decrease in the transmission rate, the transmission rate is set to the specified rate. It is further contemplated that the specific rate message may also override processing of RCBs from non-serving base stations such that the transmission rate is set to the specified rate irrespective of any RCBs received.

In another aspect of the invention, an apparatus is provided for controlling the data transmission rate in a mobile communication system during handoff for communicating between a network and a terminal. The apparatus determines an active set with respect to a terminal communicating with a base station at a first transmission rate associated with a first T/P, transmits terminal status to a serving base station, receives a rate control parameter from a serving base station and a rate control parameter from a non-serving base station, determines whether to decode the rate control parameters, and determines and sets a new data transmission rate for the terminal based on either the first T/P or a new T/P based on the rate control parameters. The apparatus may also receive and process messages from a serving base station indicating a specific data transmission rate be set and override the processing of rate control parameters from the serving base station and non-serving base stations.

It is to be understood that both the foregoing explanation and the following detailed description of the present invention are exemplary and illustrative and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings

DETAILED DESCRIPTION OF THE PREFERRED EMBODIMENTS

The present invention relates to a method and apparatus for controlling a data transmission rate for a reverse link, in which a traffic-to-pilot ratio is used to set the data transmission rate of a terminal under handoff. Although the invention is described herein with regard to controlling a data transmission rate of a terminal under handoff, it is contemplated that the invention may be utilized any time it is desired to control the data transmission rate of a first device in communication with one or more other devices by considering the status of device resources and the status of the link over which the devices communicate.

Wherever possible, the same reference numbers are used throughout the drawings to refer to the same or like parts. To aid describing the present invention, certain parameter names are being used to describe the channels, messages and variables communicated between terminals 2 and base stations 6. It should be noted that such parameter names are for illustration purposes only, and that other names may be used to describe the same or similar function.

Figure 1:
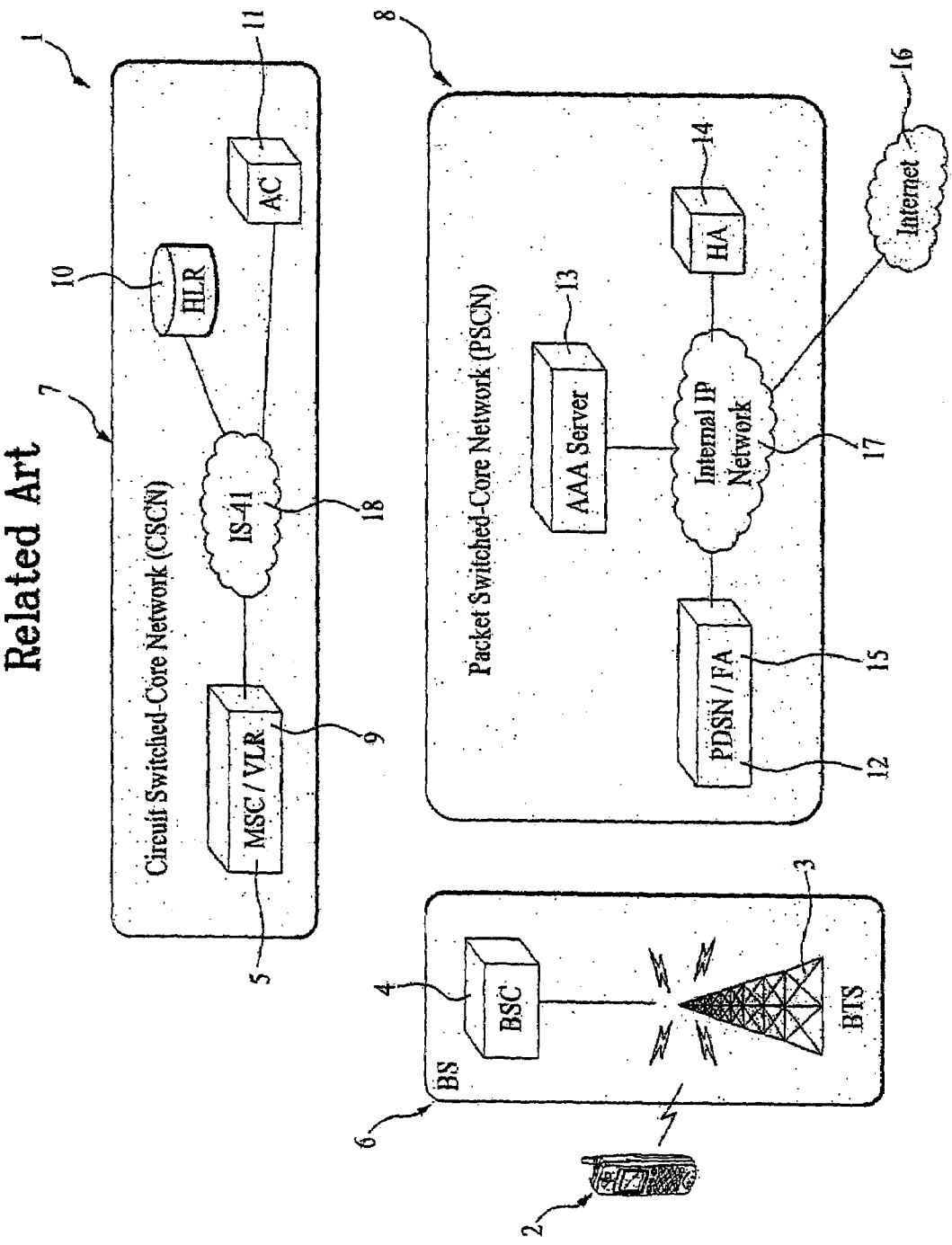
FIG. 1 illustrates a wireless communication network architecture.
Figure 2:
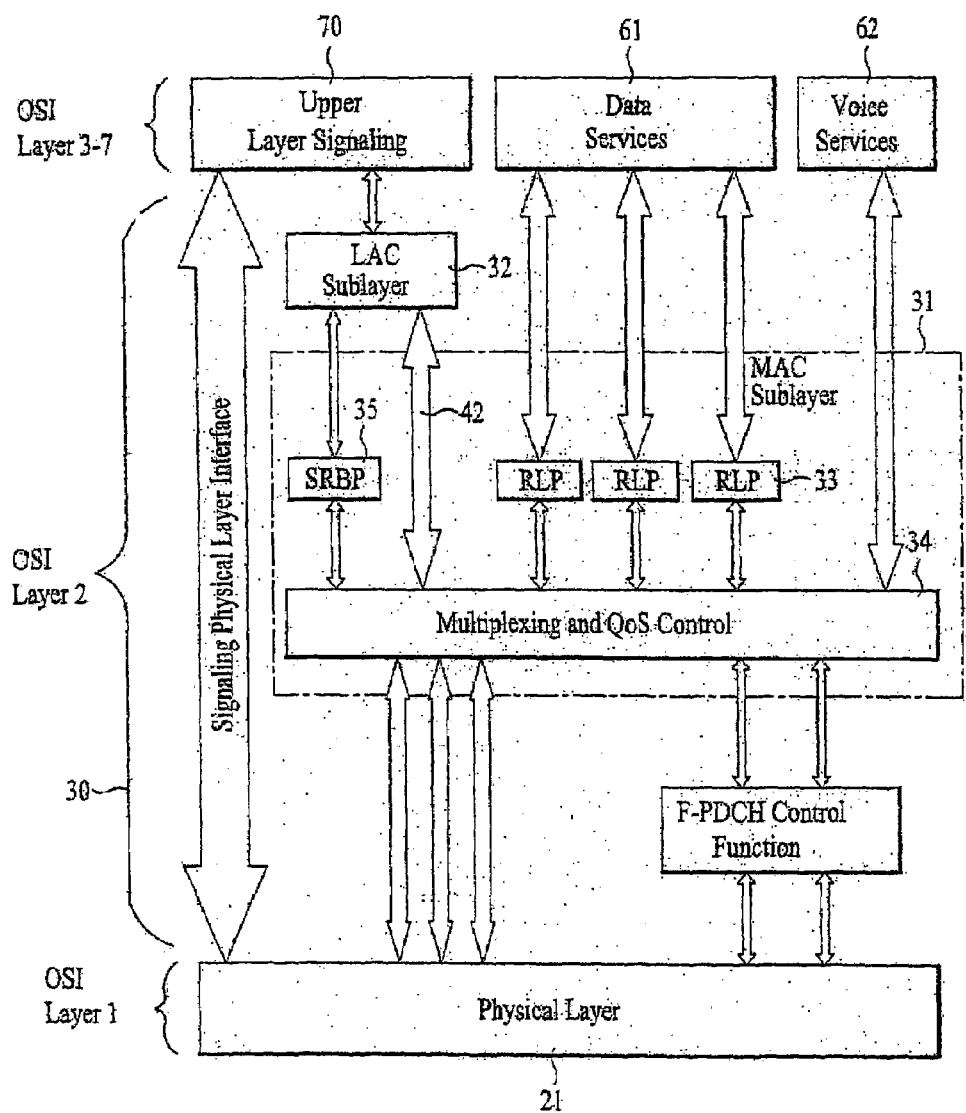
FIG. 2 illustrates a data link protocol architecture layer for a wireless network.
Figure 3:
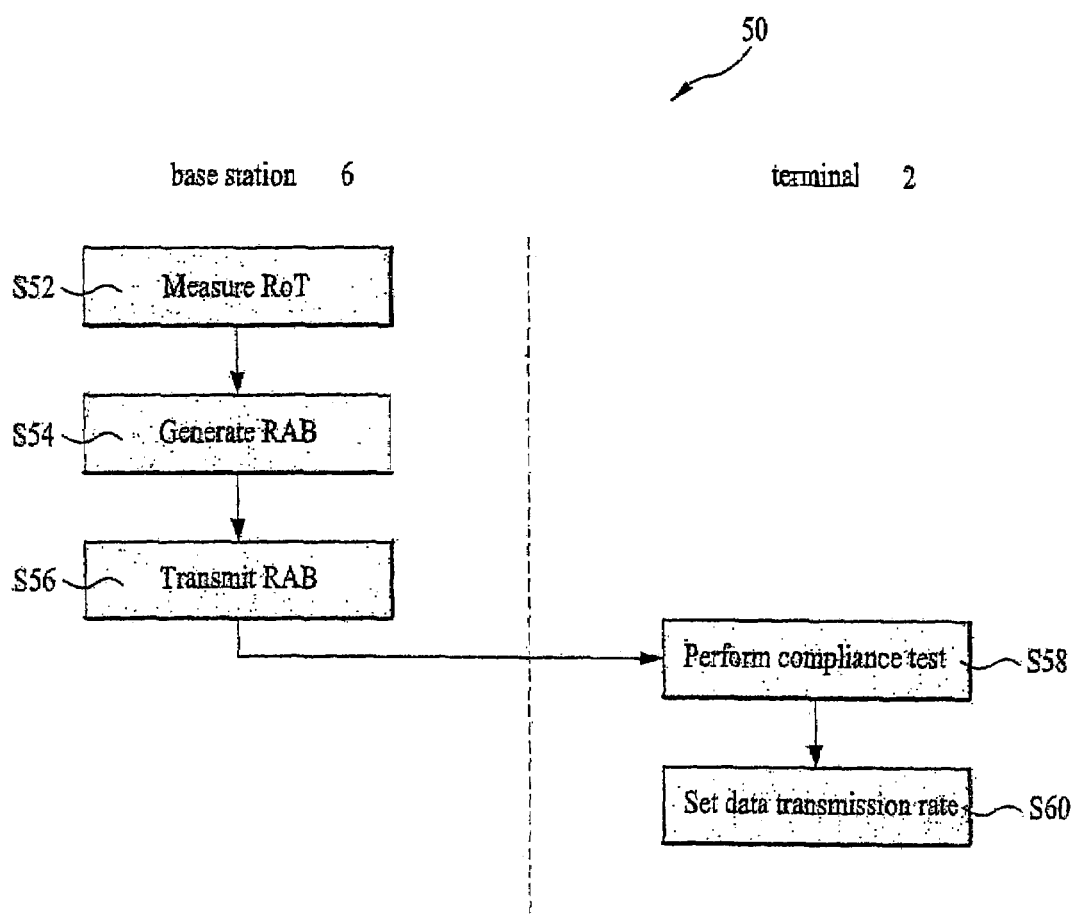
FIG. 3 illustrates a flowchart of a method for controlling a reverse-link data transmission rate according to a related art.
Figure 4:
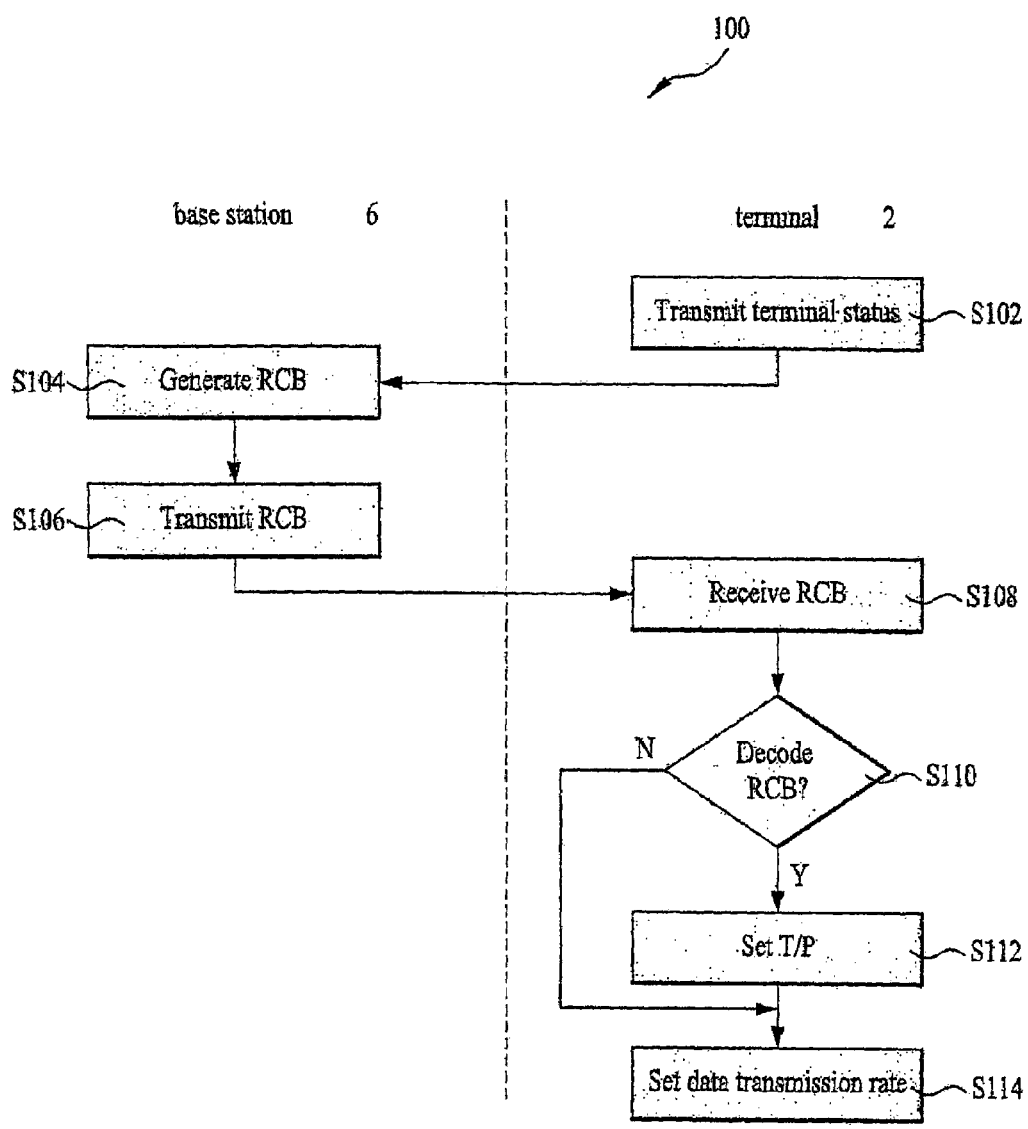
FIG. 4 illustrates a flowchart of a method for controlling a reverse-link data transmission rate according one embodiment of the present invention.

Referring to FIG. 4, a method 100 for controlling a reverse-link data transmission rate in accordance with one embodiment of the present invention is illustrated. As illustrated, a single base station 6 communicates with one of a plurality of terminals 2. The method 100 includes transmitting terminal status to a base station 6 (S102), generating a rate control bit (RCB) in the base station 6 (S104), transmitting the RCB to a terminal 2 (S106), receiving the RCB in the terminal (S108), determining whether the RCB is to be decoded (S110), setting a new T/P value (S112) if the RCB is decoded, and setting a new data transmission rate (S114) based on the T/P value. In a handoff state, the method 100 is applicable to both a serving base station 6 and one or more non-serving base stations communicating with a plurality of terminals 2.

In reverse-link data transmission, a terminal 2 typically initiates transmission independent of any base station 6 rather than a base station initiating transmission. Thus, in determining the initial transmission rate, a terminal 2 having data to transmit to a base station 6 on a reverse link performs one of two processes.

In one process, data is initially transmitted at the lowest data transmission rate currently supportable by the terminal 2, for example 9.6 kbps. In the other process, data is transmitted at a rate determined through negotiation between a terminal 2 and base station 6, for example 38.4 kbps. The terminal 2 sets the transmission rate after negotiation with the base station 6 with regard to the optimum transmission rate. In both processes, the data rate is set without any base station 6 control.

In step S102, at the outset of reverse-link data transmission at a given initial transmission rate as determined above, the terminal 2 transmits a terminal status to the base station 6. The terminal status includes at least one bit, for example a terminal status information bit, informing the base station 6 of the status of the transmitting terminal 2. Preferably, the terminal status is based on parameters affecting a desirable transmission rate such as the amount of reserve battery power available, buffer states, and the amount of data to be sent.

For subsequent data transmission, the reverse-link transmission rate is determined, or at least affected, by the base station 6. In the event that the terminal 2 transmits data at a rate higher than the highest independent data transmission rate authorized at the time of call initiation, the base station 6 controls the transmission rate.

In step S104, the base station 6 generates at least one bit of reverse-link data transmission rate control information in the form of an RCB dedicated to the terminal 2. In step S106, the base station 6 transmits the RCB to the terminal 2, either periodically or a periodically, by assigning a minimum transmission time unit, for example 20 ms, during which the base station performs at most one RCB transmission.

In generating a dedicated RCB for the terminal 2, the base station 6 considers a variety of factors including the channel status of the reverse links, the terminal status information bits, the status of resources and the forms of their services, and the rise-over-thermal. A serving base station 6 uses these factors to determine whether the data transmission rate of the terminal 2 should be increased, decreased, or maintained (held at the current rate). Non-serving base stations 6 use these factors to determine whether or not the data transmission rate of the terminal 2 should be decreased.

Furthermore, the base station 6 may also transmit an RCB indicating a decrease in the data transmission rate of the terminal 2 if a decreased rate is required due to a reception failure of a subpacket from the terminal. Such a failure is indicated, at the time of transmission, by a dedicated NACK bit for reverse packet data.

The RCB information may comprise more than one bit for use by the corresponding terminal 2, but one bit is sufficient to indicate either of two or any of three states. In the event of a two-state RCB utilizing a single bit of RCB information, one logic state may indicate an instruction to increase the data transmission rate of the terminal 2 and the opposite logic state may indicate an instruction to decrease the data transmission rate of the terminal 2. A third state, signifying a hold instruction to maintain the data transmission rate of the terminal 2 maybe indicated by the absence of RCB information from the base station 6.

Accordingly, the RCB information contains instruction information to increment, decrement, or maintain the data transmission rate of the terminal 2 and thereby set the data transmission rate of the reverse link. A negotiation process between the base station 6 and terminal 2 may be employed to set the size or number of increments/decrements to be executed for any one transmitted instruction.

In step S108, the base station 6 receives the transmitted RCB. In step S110, the terminal 2 determines whether to decode the RCB.

When a terminal 2 receives RCBs from more than one active base station 6, RCB decoding may not be required if the terminal receives NACKs from all active base stations since the terminal cannot change the data transmission rate for a re-transmission of the immediately preceding subpacket. However, the terminal 2 is still required to decode the RCBs if the terminal can no longer re-transmit the subpacket, for example if the subpacket is a final subpacket such that a new packet is being formed and transmitted. Therefore, if a terminal 2 receives an ACK signal from any one of the active base stations 6 or the immediately preceding subpacket is a final subpacket, the terminal decodes all received RCBs.

If RCB decoding is required, the terminal 2 sets the authorized traffic-to-pilot power ratio (T/P) according to the decoded contents of the RCB in step S112. If no RCB decoding is required, the present value of the T/P is not changed. In step S114, the new data transmission rate is set based on the T/P value.

The power control feature of a code division multiplex (CDMA) system, which defines the relationship between the T/P and data transmission rate, facilitates setting the data transmission rate based on the setting of a traffic-to-pilot power ratio. A CDMA system regulates transmission power so that received signal power is relatively constant while meeting performance requirements and minimizing interference. The power control for a reverse link is achieved through the use of power increase commands and power decrease commands, to maintain constant reception power in the pilot channel of the reverse link (R-PICH).

To maintain constant reception power, a base station 6 sets a threshold value, measures the received power of the R-PICH, compares the measured power with the threshold, and transmits a power increase or decrease command based on the results of the comparison. This power regulation of the R-PICH enables a similar regulation of other channels transmitted from the terminal 2, such as data channels and control channels, by establishing a ratio of the transmission power of the other channel to that of the R-PICH. This traffic-to-pilot power ratio is a value set to meet a performance requirement of the channel and is determined by the data rate, coding method, and modulation method.

The burst characteristic exhibited by data communication such as video-on-demand, audio-on-demand, and other web-based data is different from that of an audio signal enabling voice communication. Therefore, a channel has been devised for the effective handling of such data signals, referred to as packet data.

Most packet data is transmitted on a packet data channel which enables error correction through a hybrid automatic repeat request technique, whereby a terminal 2 confirms proper reception of a transmitted packet so that improperly received packets may be retransmitted without instruction from an upper layer. To avoid endless retransmission of a packet, CDMA standards limit the number of re-transmissions. Furthermore, a packet may be divided into subpackets. Each subpacket has a structure such that decoding any one subpacket is possible and the success or failure of a transmission of any subpacket can be known.

In the cdma2000 system, the coding method and the modulating method are fixed for the reverse-link PDCH such that the T/P value of the R-PDCH is a function of the data transmission rate, as illustrated in the examples of Table 1. It can be seen that the T/P value increases for higher data rates for a given reception performance since higher data rates result in greater reception energy.

In the conventional transmission of reverse-link data, a terminal 2 indicates the amount of data to be transmitted and the available transmission power and requests a data transmission rate. A base station 6 considers the limitations of the reverse-link resources and authorizes a rate of no more than that of other terminals 2 in order to maintain a balance among the terminals under the control of the base station. Upon reception of the authorized data rate on a forward-link control channel, a terminal 2 transmits data on the R-PDCH using a data rate of no more than the authorized data rate.

As can be seen in Table 1, since the data transmission rate and the traffic-to-pilot power ratio have a linear relationship, assignment of an authorized T/P defines the authorized data transmission rate. Therefore, an authorization by way of either a data transmission rate or a T/P value results in the terminal 2 transmitting on the R-PDCH at a data transmission rate less than or equal to the corresponding value.

TABLE 1

| Data rate | T/P |
|---|---|
| 19.2 kbps | 2.25 dB |
| 40.8 kbps | 5.5 dB |
| 79.2 kbps | 8.375 dB |
| 156 kbps | 11.25 dB |
| 309.6 kbps | 12 dB |
| 463.2 kbps | 13.75 dB |
| 616.8 kbps | 15.125 dB |
| 924 kbps | 17 dB |
| 1,231.2 kbps | 18.625 dB |
| 1,538.4 kbps | 20.125 dB |

Authorization using a T/P, however, provides greater flexibility. For example, if transmitting on two R-PDCHs simultaneously, authorization using a T/P allows a base station 6 to dictate one T/P and a terminal 2 to set data transmission rates within a range of power required for transmission of the two R-PDCHs, provided that neither rate exceeds that corresponding to the authorized T/P.

As another example, if transmitting data traffic having disparate performance requirements on one R-PDCH, as in the case of contrasting service types, different T/P values may be applied depending on service type. T/P values for two such service types are illustrated in Table 2. A terminal 2 transmitting a frame of each service type transmits at a data transmission rate no higher than its corresponding rate.

TABLE 2

| data rate | T/P for data frame of service 1 | T/P for data frame of service 2 |
|---|---|---|
| 19.2 kbps | 2.25 dB | 4 dB |
| 40.8 kbps | 5.5 dB | 7.25 dB |
| 79.2 kbps | 8.375 dB | 10.125 dB |
| 156 kbps | 11.25 dB | 13 dB |
| 309.6 kbps | 12 dB | 13.75 dB |
| 463.2 kbps | 13.75 dB | 15.5 dB |
| 616.8 kbps | 15.125 dB | 16.875 dB |
| 924 kbps | 17 dB | 18.75 dB |
| 1,231.2 kbps | 18.625 dB | 20.375 dB |
| 1,538.4 kbps | 20.125 dB | 21.875 dB |

In the method 100 illustrated in FIG. 4, when a base station 6 provides an RCB to a terminal 2, the terminal first sets an authorized T/P and then sets the data transmission rate based on the set T/P. As a result, the method 100 of the present invention provides greater flexibility for terminals 2 utilizing complex transmission schemes.

Figure 5:
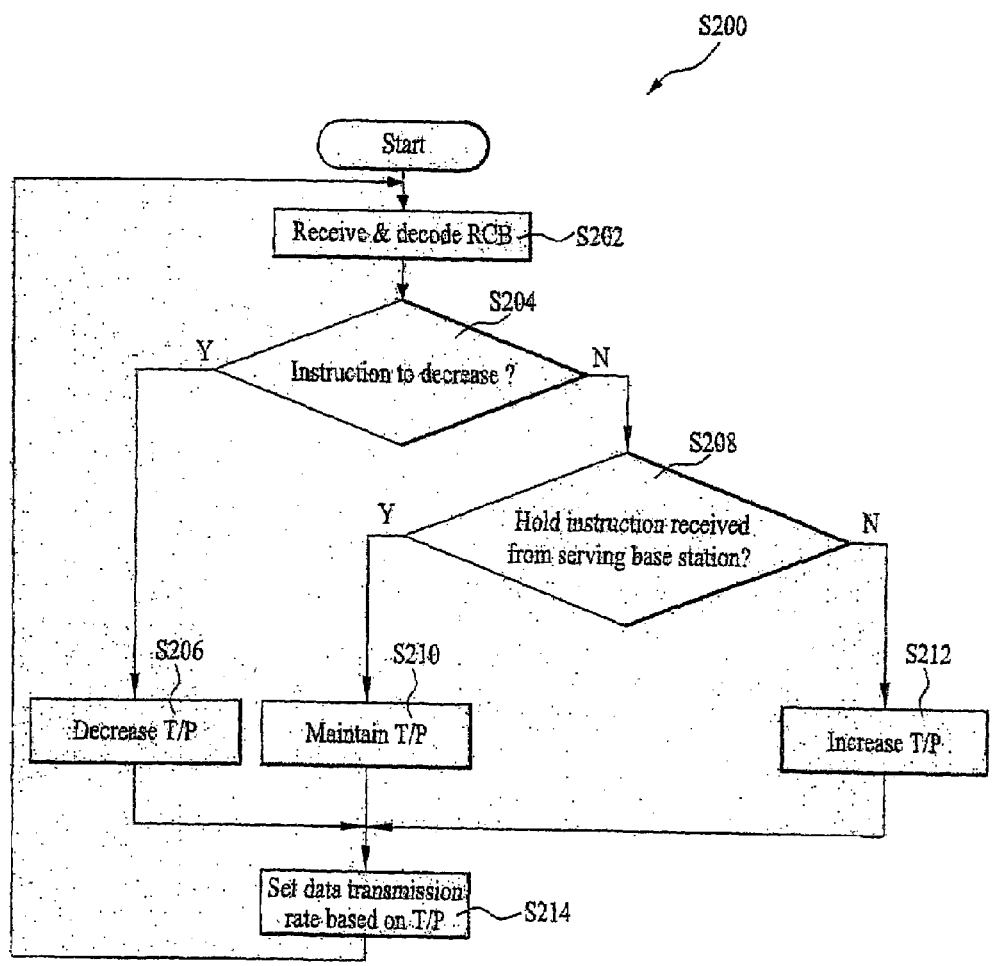
FIG. 5 illustrates a flowchart of a method for setting an authorized traffic-to-pilot power ratio based on RCBs received at a terminal under handoff according to one embodiment of the present invention.

Referring to FIG. 5, a method 200 for setting an authorized T/P by a terminal 2 under handoff conditions is illustrated. The method 200 includes receiving and decoding an RCB from a serving base station 6 and, optionally, from one or more non-serving base stations (S202), determining if the RCB contains an instruction to decrease the data transmission rate (S204), decreasing the T/P if a decrease instruction was received (S206), determining if the RCB contains a hold instruction from a serving base station 6 (S208) if no decrease instruction was received, maintaining the T/P if a hold instruction was received (S210), increasing the T/P if no hold instruction was received (S212), and setting a new data transmission rate based on the T/P (S214).

A serving base station 6 may generate and transmit an RCB containing an instruction to increase the data transmission rate, decrease the data transmission rate, or hold the data transmission rate at the current level. On the other hand, a non-serving base station 6 may generate and transmit an RCB only when a decrease of the data transmission rate is required. However, in one embodiment, a non-serving base station 6 may generate and transmit an RCB containing a null instruction as an indication that no instruction to decrease the data transmission rate is sent.

In step S202, the received RCB is decoded. It is assumed that the terminal 2 is required to decode all received RCBs, for example an ACK has been received from at least one active base station 6 or the immediately preceding subpacket was a final subpacket.

In step S204, it is determined if the received and decoded RCB contains an instruction to decrease the data transmission rate. If the RCB indicates a decrease in the transmission rate, the terminal 2 decreases the authorized traffic-to-pilot power ratio (T/P) in step S206.

As noted previously, even if a base station 6 transmits a NACK due to reception of no subpacket from the terminal 2, the base station can transmit a decrease instruction when a decreased transmission rate is required. Therefore, when the terminal 2 receives a decrease instruction and a NACK from one base station 6 and an ACK from another base station, the terminal may still decrease the T/P in step S206.

However, in another embodiment, the T/P may be decreased in step S204 only upon simultaneous receipt of an RCB containing an instruction to decrease the data transmission rate and an ACK from the same base station 6. If the RCB containing an instruction to decrease the data transmission rate is received with a NACK from the base station 6, processing continues as if no instruction to decrease the data transmission rate was received from that base station.

If no decrease instruction was received, it is determined in step S208 whether the RCB is from the serving base station 6 and the data transmission rate control information indicates a hold instruction. If a hold instruction was received from the serving base station 6, the terminal 2 maintains the authorized T/P in step S210. In the absence of a decrease instruction or a hold instruction from the serving base station 6, the terminal 2 increases the T/P in step S212.

In step S214, a new data transmission rate is set based on the new T/P. The new transmission rate may be an increase over the previous rate, a decrease of the previous rate or the same as the previous rate.

As a terminal 2 transits between base stations 6, for example during a cell-switching operation from one base station to another, the original base station continues to act as the serving base station only until the cell-switching operation is completed. Once the cell-switching operation is completed, the original base station 6 becomes a non-serving base station. However, under soft handoff conditions, when there may be more than one serving base station 6, the terminal 2 operates according to commands only from the original base station and the setting of the T/P is determined by considering only RCBs from the original serving base station and non-serving base stations. Hence, an RCB from the new serving base station 6 is ignored until the cell-switching operation is completed.

FIG. 5 illustrates communication with a single terminal 2. In practice, however, a plurality of active terminals 2 are present in any one cell. A dedicated RCB may be generated and transmitted to each of a plurality of terminals 2 via one common channel.

Figure 6:
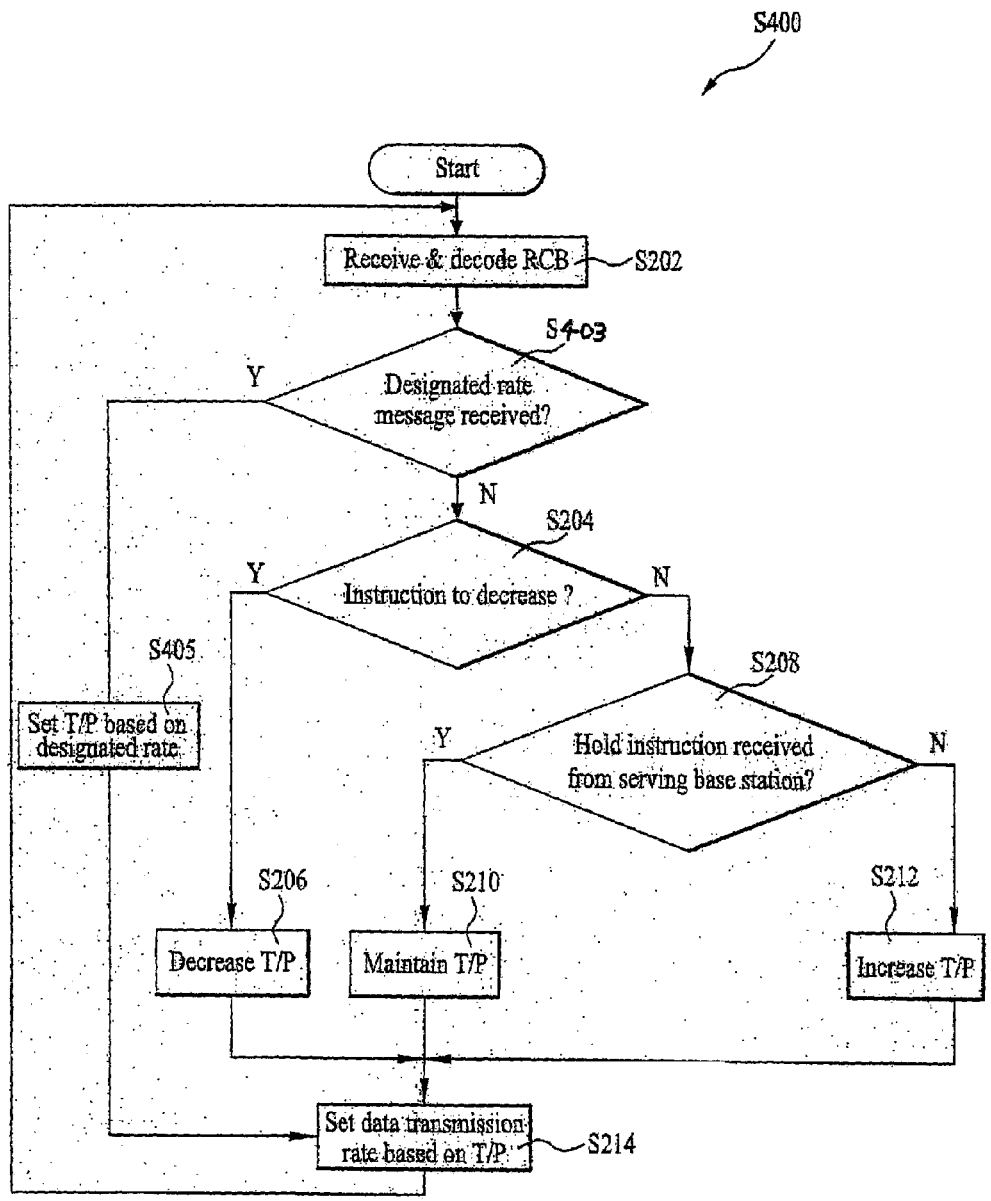
FIG. 6 illustrates a flowchart of a method for setting an authorized traffic-to-pilot power ratio based on RCBs received at a terminal under handoff according to another embodiment of the present invention.

In other embodiments, the setting of the T/P based on an RCB from a base station 6 may be overridden by a message provided aperiodically by a serving base station designating a specific data transmission rate. FIG. 6 illustrates an embodiment in which a message designating a specific data rate overrides all RCBs received, whether from a serving base station 6 or a non-serving base station. In another embodiment, a message designating a specific data rate overrides only an RCB received from a serving base station 6. Both embodiments are similar to method 200.

The method 400 illustrated in FIG. 6 differs from the method 200 illustrated in FIG. 5 in that, after the RCB is received and decoded in step S202, it is determined in step S403 if a designated rate message was received. If a designated rate message was received, the T/P is set based on the indicated rate in step S405. If no designated rate message was received, it is determined in step S204 whether the RCB indicates a decrease in the data transmission rate.

The embodiment in which a message designating a specific data rate overrides only an RCB received from the serving base station differs from the method 200 illustrated in FIG. 5 in that, after it is determined in step S204 that the received RCB indicates a decrease in the transmission rate, it is further determined if the RCB indicating a decrease in the transmission rate was received from a non-serving base station 6. If the RCB was received from a non-serving base station 6, the T/P is decreased in step S206. If the RCB to decrease the data transmission rate was not received from a non-serving base station 6, it is determined if a designated rate message was received. If a designated rate message was received, the T/P is set based on the indicated rate. If no designated rate message was received, the T/P is decreased in step S206.

The embodiment in which a message designating a specific data rate overrides only an RCB received from the serving base station further differs from the method 200 illustrated in FIG. 5 in that, after it is determined in step S204 that no RCB to decrease the data transmission rate was received, it is determined if a designated rate message was received. If a designated rate message was received, the T/P is set based on the indicated rate. If no designated rate message was received, it is determined in step S208 whether the RCB was received from the serving base station 6 and indicates a "hold" instruction.

Figure 7:
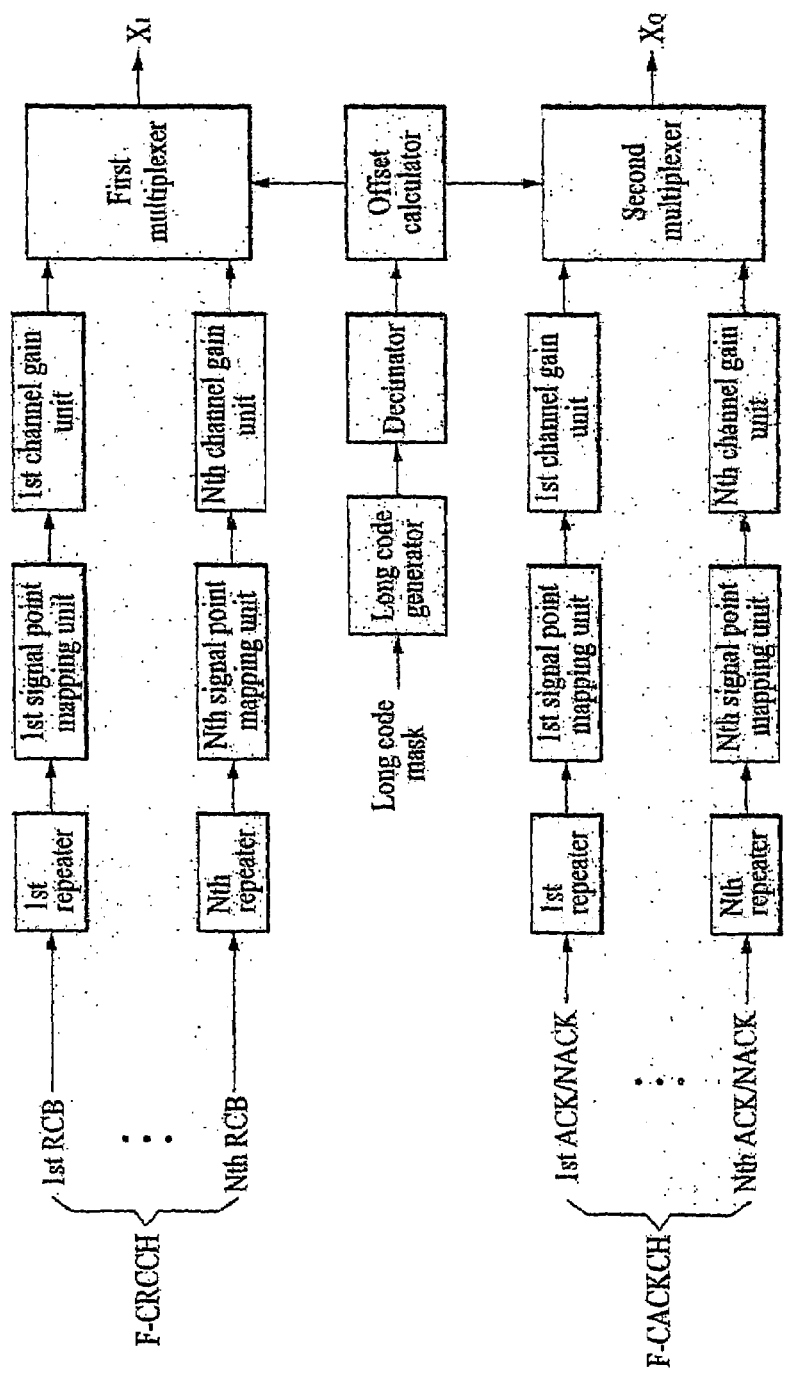
FIG. 7 illustrates a block diagram of a channel structure for transmitting a plurality of rate control bits and a corresponding plurality of ACK/NACK bits, to implement a method of the present invention.

FIG. 7 illustrates a configuration of the common channel, referred to here as a forward-link common rate control channel (F-CRCCH), which is multiplexed with a forward-link common acknowledgment channel (F-CACKCH) for transmitting a corresponding plurality of ACK/NACK bits dedicated to reverse-link packets transmitted from the plurality of terminals 2. The channel configuration is achieved using a repeater, a signal point mapping unit, and a channel gain unit for each dedicated RCB for a plurality (1 through N) of terminals 2 and corresponding elements for each ACK/NACK bit. A long code is generated in a long code generator for input to a decimator, and the decimator output is input to an offset calculator. First and second multiplexers are provided for multiplexing the plurality RCB inputs and the plurality of ACK/NACK inputs, respectively, using the calculated offset from the offset calculator. The outputs of the first and second multiplexers are quadrature phase shift keying signals XI and XQ.

Figure 8:
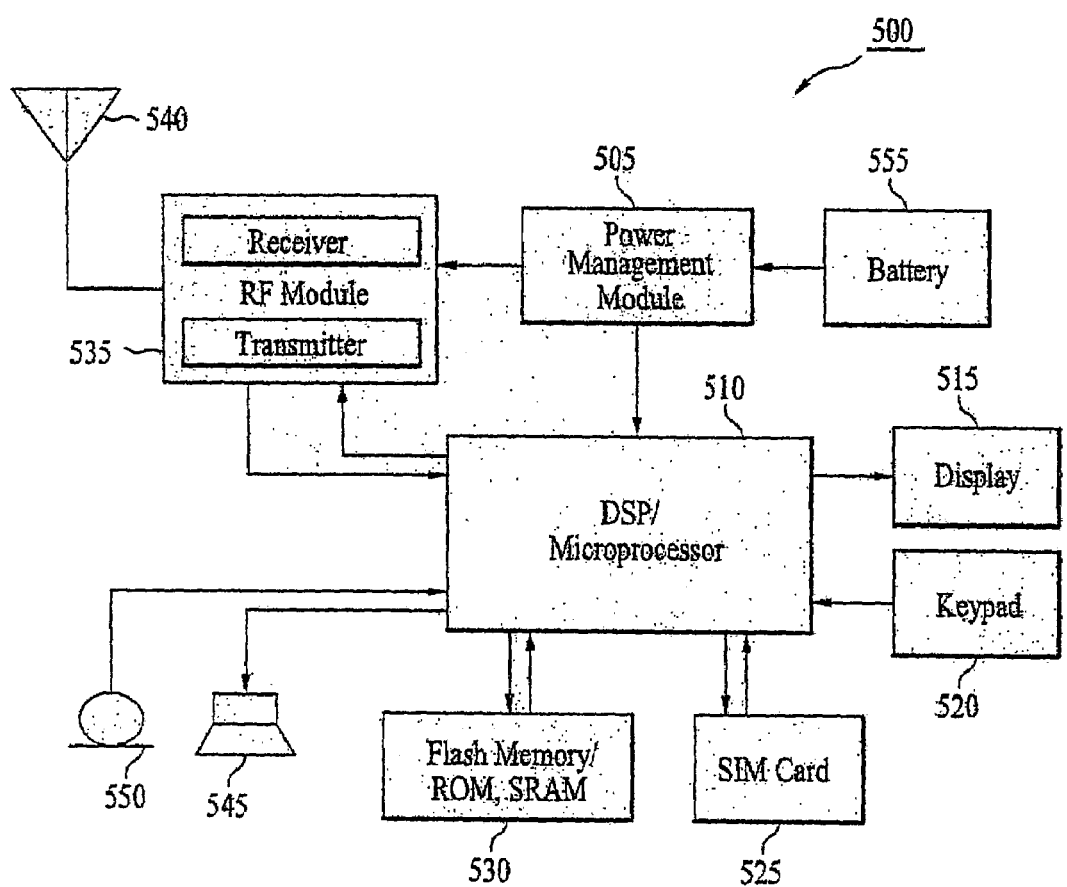
FIG. 8 illustrates a block diagram of mobile station according to the preferred embodiment of the present invention.

FIG. 8 illustrates a block diagram of mobile station according to the preferred embodiment of the present invention. The mobile station 500 includes a processor (or digital signal processor) 510, RF module 535, power management module 505, antenna 540, battery 555, display 515, keypad 520, memory 530, SIM card 525 (which may be optional), speaker 545 and microphone 550.

A user enters instructional information, such as a telephone number, for example, by pushing the buttons of a keypad 520 or by voice activation using the microphone 550. The microprocessor 510 receives and processes the instructional information to perform the appropriate function, such as to dial the telephone number. Operational data may be retrieved from the Subscriber Identity Module (SIM) card 525 or the memory module 530 to perform the function. Furthermore, the processor 510 may display the instructional and operational information on the display 515 for the user's reference and convenience.

The processor 510 issues instructional information to the RF section 535, to initiate communication, for example, transmit radio signals comprising voice communication data. The RF section 535 comprises a receiver and a transmitter to receive and transmit radio signals. An antenna 540 facilitates the transmission and reception of radio signals. Upon receiving radio signals, the RF module 535 may forward and convert the signals to baseband frequency for processing by the processor 510. The processed signals would be transformed into audible or readable information outputted via the speaker 545, for example. The processor 510 also performs the functions necessary to implement the methods 100, 200, 300, 400 described herein in order to control a reverse-link data transmission rate and set an authorized T/P by a terminal 2 under handoff conditions.

By utilizing the methods of the present invention for controlling data transmission rate for a reverse link, a terminal 2 can transmit data effectively by considering the status of resources and a channel status of the reverse link to generate dedicated data transmission rate control information in the base stations 6 for transmission to a plurality of terminals. At the same time, the terminal 2 can eliminate the ambiguity surrounding the rate control of a terminal in soft handoff mode. The methods of the present invention provide greater flexibility for terminals utilizing complex transmission schemes, reduce the rise-over-thermal of a base station 6, improve a reverse-link transmission rate to enhance the efficiency of the reverse link, and provide data transmission rate control information to respective terminals 2 based on the status of the reverse links and the rise-over-thermal at the base station.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for controlling the data transmission rate in a mobile communication system during handoff for communicating between a network and a mobile station, the method comprising the steps of:

determining an active set with respect to the mobile station communicating with the base station at a first data transmission rate, wherein the active set comprises a serving base station and at least one non-serving base station and the first data transmission rate is associated with an authorized traffic-to-pilot power ratio;

receiving, at the mobile station, a first rate control parameter provided by the serving base station and a second rate control parameter provided by the at least one non-serving base station;

updating, in the mobile station, the authorized traffic-to-pilot power ratio based on the first and the second rate control parameters; and determining a second data transmission rate based on the updated authorized traffic-to-pilot power ratio, the second data transmission rate one of an increased rate with respect to the first data transmission rate, a decreased rate with respect to the first data transmission rate and the same rate as the first data transmission rate, wherein the first rate control parameter comprises one of a first state associated with increasing the authorized traffic-to-pilot power ratio, a second state associated with decreasing the authorized traffic-to-pilot power ratio and a third state associated with maintaining the authorized traffic-to-pilot power ratio, and the second rate control parameter comprises a fourth state associated with decreasing the authorized traffic-to-pilot power ratio.

2. The method of claim 1, wherein the authorized traffic-to-pilot power ratio is decreased when the second rate control parameter is in the fourth state.

3. The method of claim 1, wherein the authorized traffic-to-pilot power ratio is set to a ratio associated with the first rate control parameter when the second rate control parameter is not in the fourth state.

4. The method of claim 3, wherein the authorized traffic-to-pilot power ratio is increased when the first rate control parameter is in the first state.

5. The method of claim 3, wherein the authorized traffic-to-pilot power ratio is decreased when the first rate control parameter is in the second state.

6. The method of claim 3, wherein the authorized traffic-to-pilot power ratio is maintained at the current value when the first rate control parameter is in the third state.

7. The method of claim 1, wherein the second rate control parameter comprises one of a fourth state associated with decreasing the authorized traffic-to-pilot power ratio and a fifth state associated with a null state indicating no decrease in the authorized traffic-to-pilot power ratio.

8. The method of claim 1, further comprising the steps of:

receiving a first transmission status signal in the mobile station, the first transmission status signal provided by the serving base station and associated with acknowledging receipt status of packet data transmitted from the mobile station; and receiving a second transmission status signal in the mobile station, the second transmission status signal provided by the at least one non-serving base station and associated with acknowledging receipt status of packet data transmitted from the mobile station.

9. The method of claim 8, wherein the mobile station decodes at least one of the first and second rate control parameters if at least one of the first and second transmission status signals indicates proper receipt of the packet data.

10. The method of claim 8, wherein the mobile station decodes at least one of the first and second rate control parameters after transmitting last subpacket data.

11. The method of claim 8, wherein the first and second rate control parameters are decoded when one of the first transmission status signal indicates proper receipt of the packet data, the second transmission status signal indicates proper receipt of the packet data, and last subpacket data was transmitted.

12. The method of claim 8, wherein the authorized traffic-to-pilot power ratio is decreased when the second rate control parameter is in the fourth state and one of the first transmission status signal indicates proper receipt of the packet data and the second transmission status signal indicates proper receipt of the packet data.

13. The method of claim 8, wherein the authorized traffic-to-pilot power ratio is set to a ratio associated with the first rate control parameter when the second rate control parameter is not in the fourth state and wherein the authorized traffic-to-pilot power ratio is decreased when the first rate control parameter is in the second state and one of the first transmission status signal indicates proper receipt of the packet data and the second transmission status signal indicates proper receipt of the packet data.

14. The method of claim 8, wherein the authorized traffic-to-pilot power ratio is set to a ratio associated with the first rate control parameter when the second rate control parameter is in the fourth state and the second transmission status signal does not indicate proper receipt of the packet data transmitted from the mobile station and wherein the authorized traffic-to-pilot power ratio is not decreased when the second rate control parameter is not in the fourth state, the first rate control parameter is in the second state and the first transmission status signal does not indicate receipt of the packet data transmitted from the mobile station.

15. The method of claim 1, further comprising the step of:
receiving a grant message in the mobile station, the grant message provided by the serving base station and indicating a designated data transmission rate for use by the mobile station.

16. The method of claim 15, wherein the authorized traffic-to-pilot power ratio is decreased when the second rate control parameter is in the fourth state and the authorized traffic-to-pilot power ratio is set to a ratio associated with the designated data transmission rate when the second rate control parameter is not in the fourth state.

17. The method of claim 15, wherein the authorized traffic-to-pilot power ratio is set to a ratio associated with the designated data transmission rate.

18. The method of claim 15, wherein the grant message is provided aperiodically.

19. The method of claim 15, wherein the grant message is provided periodically.

20. The method of claim 1, the active set comprising a first serving base station providing a first rate control parameter and a second serving base station providing a third rate control parameter, further comprising the steps of:
transmitting mobile station status from the mobile station to the first serving base station and the second serving base station; and
receiving the third rate control parameter in the mobile station,
wherein the third rate control parameter is ignored when updating the authorized traffic-to-pilot power ratio.

21. The method of claim 1, wherein the terminal status is based on one of the amount of reserve battery power available in the mobile station, buffer states of the mobile station, and an amount of data to be sent by the mobile station.

22. The method of claim 1, wherein the first control parameter and the second control parameter each consist of a single bit.

23. The method of claim 1, wherein the first control parameter and the second control parameter each consist of multiple bits.

24. A method of transmitting data on an uplink channel at a mobile station in a mobile communication system during handoff for communicating between a network and the mobile station, the method comprising the steps of:
receiving a first rate control parameter from a serving base station, the first rate control parameter comprising one of a first state associated with increasing an authorized traffic-to-pilot power ratio, a second state associated with decreasing the authorized traffic-to-pilot power ratio and a third state associated with maintaining the authorized traffic-to-pilot power ratio;
receiving a second rate control parameter from at least one non-serving base station, the second rate control parameter including a fourth state associated with decreasing the authorized traffic-to-pilot power ratio;
updating the authorized traffic-to-pilot power ratio by using the first and the second rate control parameters; and
transmitting uplink data on the uplink channel to the network, the uplink data having a data transmission rate determined based on the updated authorized traffic-to-pilot power ratio.

25. The method of claim 24, wherein the authorized traffic-to-pilot power ratio is decreased when the second rate control parameter is in the fourth state.

26. The method of claim 24, wherein the authorized traffic-to-pilot power ratio is set to a ratio associated with the first rate control parameter when the second rate control parameter is not in the fourth state.

27. The method of claim 26, wherein the authorized traffic-to-pilot power ratio is increased when the first rate control parameter is in the first state.

28. The method of claim 26, wherein the authorized traffic-to-pilot power ratio is decreased when the first rate control parameter is in the second state.

29. The method of claim 26, wherein the authorized traffic-to-pilot power ratio is maintained at the current value when the first rate control parameter is in the third state.

30. The method of claim 24, wherein the second rate control parameter comprises one of a fourth state associated with decreasing the authorized traffic-to-pilot power ratio and a fifth state associated with a null state indicating no decrease in the authorized traffic-to-pilot power ratio.

31. A method of transmitting data on an uplink channel at a mobile station in a mobile communication system during handoff for communicating between a network and the mobile station, the method comprising the steps of:
receiving a first rate control parameter from a serving base station, the first rate control parameter comprising one of a first state associated with increasing an authorized traffic-to-pilot power ratio, a second state associated with decreasing the authorized traffic-to-pilot power ratio and a third state associated with maintaining the authorized traffic-to-pilot power ratio;

checking whether a second rate control parameter is received from at least one non-serving base station, the second rate control parameter including a fourth state associated with decreasing the authorized traffic-to-pilot power ratio;

updating the authorized traffic-to-pilot power ratio depending on whether or not the second rate control parameter is received; and transmitting uplink data on the uplink channel to the network, the uplink data having a data transmission rate determined based on the updated authorized traffic-to-pilot power ratio.

32. The method of claim 31, wherein the authorized traffic-to-pilot is decreased when the second rate control parameter is received.

33. The method of claim 31, wherein the authorized traffic-to-pilot is set to a authorized traffic-to-pilot associated with the first rate control parameter when the second rate control parameter is not received.

* * * * *

UNITED STATES PATENT AND TRADEMARK OFFICE Certificate

Patent No. 7,369,501 B2                                                            Patented: May 6, 2008

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Ki Jun Kim, Seoul (KR); Young Woo Yun, Seoul (KR); Soon Yil Kwon, Kyonggi-do (KR); Cheol Woo You, Seoul (KR); Jong Hoe An, Seoul (KR).

Signed and Sealed this Twenty-seventh Day of March 2012.

CHARLES N. APPIAH
*Supervisory Patent Examiner*
Art Unit 2617
Technology Center 2600